(12) United States Patent
Hartmann

(10) Patent No.: US 6,399,033 B1
(45) Date of Patent: Jun. 4, 2002

(54) PROCESS FOR INCREASING THE YIELD IN THE MANUFACTURE OF TITANIUM DIOXIDE BY THE CHLORIDE PROCESS

(75) Inventor: Achim Hartmann, Pulheim (DE)

(73) Assignee: Kronos, Inc., Hightstown, NJ (US)

( * ) Notice: Subject to any disclaimer, the term of this patent is extended or adjusted under 35 U.S.C. 154(b) by 1024 days.

(21) Appl. No.: 08/552,407

(22) Filed: Nov. 3, 1995

(30) Foreign Application Priority Data

Dec. 1, 1994 (DE) .......................................... 44 42 783

(51) Int. Cl.[7] .............................................. C22B 34/12
(52) U.S. Cl. ............................. 423/74; 423/76; 423/77; 423/492; 423/610
(58) Field of Search ................................ 423/179, 613, 423/614, 74, 76, 77, 79, 610, 492

(56) References Cited

U.S. PATENT DOCUMENTS

| | | | | |
|---|---|---|---|---|
| 2,701,180 A | * | 2/1955 | Krchma ........................ 423/79 |
| 3,050,362 A | * | 8/1962 | Oppegaard et al. ............ 423/79 |
| 3,227,545 A | * | 1/1966 | Hildreth ........................ 423/79 |
| 3,867,515 A | * | 2/1975 | Bohl et al. .................... 423/613 |
| 3,906,077 A | * | 9/1975 | Rado et al. ................... 423/149 |
| 4,125,385 A | * | 11/1978 | Rado et al. ................... 165/140 |
| 4,144,316 A | * | 3/1979 | Haack et al. ................. 423/502 |
| 4,183,899 A | * | 1/1980 | Bonsack ........................ 423/79 |
| 4,435,365 A | * | 3/1984 | Morris ........................... 423/79 |
| 4,442,076 A | * | 4/1984 | Bonsack ........................ 423/79 |
| 5,073,355 A | * | 12/1991 | Hartmann ...................... 423/79 |
| 5,468,394 A | * | 11/1995 | Bader ........................... 423/158 |

FOREIGN PATENT DOCUMENTS

EP 318231 * 5/1989

OTHER PUBLICATIONS

Paige et al, "Physical Beneficiation of Titanium Peant Solid Wastes: Recovery of Titanium Minerals and Coke", Bureau of Mines Report of Investigations–1982 (no month).*
Perry et al, "Chemical Engineers' Handbook", Fifth edition, TP 151. C52, 1973, pp. 21–41 (no month).*

* cited by examiner

Primary Examiner—Ngoc-Yen Nguyen

(57) ABSTRACT

An improvement to the chloride process of making titanium dioxide. By recycling some of the cyclone dust, the yield in the chlorination of titanium-containing raw materials can be increased. In order to prevent silica accumulation in the fluidized bed, the cyclone dust is divided into two fractions. An economic solution is described of a single-stage separation of the cyclone dust in a hydrocyclone, the majority of the titanium dioxide occurring in the hydrocyclone underflow, although the separation is not sharp. By grinding and drying the solids from the hydrocyclone underflow, the titanium dioxide particles returned to the lower region of the fluidized-bed reactor are rapidly chlorinated, while the quartz and coke particles are rapidly discharged again from the fluid bed, so that no silica contamination occurs.

16 Claims, 1 Drawing Sheet

PROCESS FOR INCREASING THE YIELD IN THE MANUFACTURE OF TITANIUM DIOXIDE BY THE CHLORIDE PROCESS

CROSS REFERENCE TO RELATED APPLICATION

This application is a United States counterpart patent application to originating German Patent Application No. P4442783.2 filed Dec. 1, 1994, the disclosure of which is hereby incorporated by reference.

FIELD OF THE INVENTION

The process of the present invention relates to an improved process for the manufacture by the chloride process of titanium dioxide useable for pigments and other purposes. In such process, titanium dioxide—containing ore is reacted with chlorine to produce gaseous titanium tetrachloride. Then the titanium tetrachloride, after purification, is reacted or combusted with oxygen in a burner reactor unit or zone to produce highly pure titanium dioxide.

SUMMARY OF THE INVENTION

The present invention relates specifically to a process for the continuous production of titanium tetrachloride by chlorination of titanium-containing raw materials in the presence of coke at temperatures around 1000° C. in a reactor, which is normally in actual operation a fluidized-bed reactor. Discharged from the reactor are gaseous volatile metal chlorides and, in addition, finely divided bed material, in particular unreacted titanium dioxide ($TiO_2$) and silica or quartz ($SiO_2$) from the ore, and coke or carbon (C) which are entrained in the discharge gases. Cooling or quenching of the gas-solid mixture then occurs to approximately 150°–200° C., and the solid mixture is separated. This separated material has been long termed "cyclone dust"; for example a cyclone separator used with halide containing gases is shown in U.S. Pat. No. 4,125,385. This cyclone dust comprises condensed metal chlorides and the other solids including $TiO_2$, C, and $SiO_2$. The dust is then suspended in a liquid, and solid particles are classified in a single separation apparatus. Separate fractions are created and after drying and grinding, the titanium dioxide-rich fraction is returned to the reactor.

DESCRIPTION OF THE PRIOR ART

Titanium dioxide pigment is widely used in industry as an opacifying pigment for paints and paper coatings, and as a pigmentary agent for a wide variety of fibers and textiles. To create or enhance specially desired pigmentary properties for particular end uses, the pigment is conventionally coated or mixed with other substances, and subjected to a wide variety of treatments.

The production of titanium dioxide by vapor phase oxidation of titanium tetrachloride with oxygen, or an oxygen-containing gas, has been growing in importance compared with older processes in which titaniferous raw materials such as ores and/or slag were digested with mineral acids, preferably sulfuric acid.

The chemical stoichiometry of the chlorinating titanium dioxide process can be simply exemplified by the following equations wherein titanium dioxide is reacted with chlorine gas and carbon:

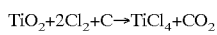

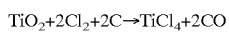

Among the reasons for growing acceptance of the chloride process is that in vapor phase titanium tetrachloride oxidation only solid and gaseous reaction products are generated. Thus, little or none dilute liquid waste acid is created, as in the sulfate process, requiring additional process steps and higher operating costs for re-concentration and treatment. Furthermore, the chloride process is more cost-efficient, and produces, in the view of many customers of titanium dioxide pigments, better quality titanium dioxide.

Titanium tetrachloride is the important initial raw material for the manufacture of titanium dioxide. As shown above, titanium tetrachloride is produced by the chlorination of titanium-containing raw materials in the presence of a carbon-containing compound. Suitable titanium-containing raw materials referred to as "ores" include natural and synthetic rutile, titanium-containing slags or other titanium-containing minerals, for example ilmenite. Carbon-containing compounds include anthracite coal and coke, for example petroleum coke.

The ore materials are chlorinated in a dispersed form at elevated temperatures. In the process, the metal oxides contained in the ore raw material are converted into the corresponding metal chlorides. Following the precipitation of low volatility metal chlorides and other impurities, as discussed below, from the exhaust gases of the chlorination, the highly volatile titanium tetrachloride is liquified by cooling in a condensation stage to approximately −20° C. and then reacted with oxygen at very elevated temperatures to produce pure titanium dioxide.

Titanium dioxide ore raw materials also contain silica compounds. Ilmenite, for example, contains on the average up to 3% by weight $SiO_2$. The exhaust gas in addition to $SiO_2$ also can contain small amounts of silicon tetrachloride.

As a consequence of the increasing severity of regulations concerning purity of air and water and in view of the necessity to operate chemical processes as economically as possible, efforts in all chemical businesses throughout the world are being made to reduce the volume of industrial wastes and to recycle any reusable waste material as secondary raw material. It has become particularly important to the success of the chloride process of making titanium dioxide that both maximum use of the starting ore be achieved and that the amount and type of waste disposed is minimized. The use of as much as possible of the titanium dioxide contained in the ore has long been a goal, and environmental and other concerns have put increasing pressure on the economics of waste disposal. The present invention in fact satisfies both these important concerns.

U.S. Pat. No. 5,073,355 describes how the chlorination of titaniferous and ferriferous ore material generates not only titanium tetrachloride but other solids and gases as well as non-reacted constituents of the ore feedstock. The patent further describes how an aqueous solution containing such materials in suspension is produced from these solids including non-reacted feedstock material, reducing agents, and insolubles formed during the dissolving process. U.S. Pat. No. 3,906,077 discloses a process for purifying ferric chloride involving the withdrawal of a liquid containing non-volatile impurities and introducing this along with ferric chloride, into the chlorinator effluent gases.

U.S. Pat. No. 4,435,365 shows the reuse and processing of titanium-containing material in a three separation zone process involving a hydrocyclone (see second separation zone 44) and requiring a digestion step, where after digestion and drying, the recycled titanium dioxide is transported to the reaction zone which preferably comprises a chlorination reactor. The recycled titanium dioxide is transported in a different path than the chlorine to the reaction zone of the chlorination reactor where it is combined with a carbonaceous reducing agent and mixed with chlorine at elevated temperature.

U.S. Pat. No. 4,183,899 shows the separation of titanium dioxide and coke in a vapor process in an unreacted feedstock-coke separator zone. U.S. Pat. No. 4,442,076 shows a process for separating carbon and titaniferous solids from the effluent of the reaction zone with a solids separator and recycling these as powder into the reaction zone. Another prior art titanium dioxide process patent showing recycling steps for ferric chloride is U.S. Pat. No. 4,144,316.

In European Patent No. 318 231 A1, which has no United States counterpart, the considerable expenditure for processing waste material is described where finely divided bed material (especially $TiO_2$ and coke) discharged from a reactor is separated from the metal chlorides and land-filled. Hydrocyclones and concentrating tables are used for the separation. Such concentrating tables react very critically to the ore composition, because of which, constant monitoring and change of the process parameters must be carried out if the composition of the ore used changes in even the slightest degree. In this process the coke is separated off from the titanium dioxide relatively sharply but with great effort, the titanium dioxide containing product is stated to have up to 96% titanium dioxide and is stored in bins, likely for commercial sale.

None of the above art takes into account how the accumulation of quartz in the bed of the chlorination reactor should be avoided so that the entire chlorination process need not be periodically terminated to "clean-out" the reactor. All of the above art is particularly complicated and strives for sharp divisions of various products in a search for chemical perfection which the present invention finds to be an unnecessary expense.

OBJECT OF THE INVENTION

The object of the instant invention is to substantially improve the economic efficiency and operational reliability of the chlorination process and the use of ore, and simultaneously, diminish the waste generated. The object is achieved by a process that carries out a rough classification of reprocessing components in a single stage in a hydroclone and returns, preferably ground and dried, the titanium-dioxide-rich fraction to the fluidized-bed reactor for immediate reuse. The process unexpectedly proceeds without silica contamination of the fluidized bed.

An essential advantage of the invention is that, using a simple classifying apparatus under defined operating conditions, expedient inexpensive division of the solids of the cyclone dust into a titanium-dioxide-rich and a low-titanium-dioxide fraction is accomplished without the need for complicated apparatus.

BRIEF DESCRIPTION OF THE PREFERRED EMBODIMENTS

The inventors have discovered that it is considerably more expedient, convenient and less expensive not to strive for sharp separation by use of a series of hydroclones, separators and digesters to divide the constituents of the cyclone dust into various products of the highest possible purity with respect to coke, silica and titanium dioxide, but, in contrast, that it is effective to obtain two fractions by a relatively indistinct single-stage separation. The major part of the coke and silica is contained in the overflow fraction, and the silica and coke content is considerably decreased in the underflow feature of a separation apparatus, preferably a hydrocyclone. It has been unexpectedly discovered that even though a portion of the silica and coke remains in the product in the underflow of the hydrocyclone, the underflow fraction can be recycled to the chlorinator without complicated steps including digestion and further hydrocyclone steps. This underflow fraction contains the majority of the unreacted titanium dioxide, some silica and also a small residue of coke.

A second important preferred process feature is the grinding of the returned titanium-dioxide rich material, where by far the majority of the titanium dioxide and other particles in the composition are processed to have a particle size below about 0.1 mm. In another inventive step, the titanium-dioxide-rich fraction or composition is introduced into the fluidized bed at a spot where the chlorine content in the surroundings is as high as possible, i.e. in the bottom region of the fluidized-bed reactor or even at the chlorine gas inlet into the reactor by direct addition into the fluidizing gas (which can be make-up or recycled chlorine or mixtures thereof).

The above measures have the effect that the returned titanium dioxide particles in the fluidized bed of the reactor are converted into titanium tetrachloride very rapidly, and is based in part on the discovery that the silica particles in the returned titanium dioxide-containing composition, because of their fine particle size, do not remain in the fluidized bed, but are rapidly carried away and discharged with the gas stream to be processed again in the hydroclone. The silica returned via the hydrocyclone underflow in the titanium-dioxide-rich fraction therefore does not thus cause "enrichment", or contamination, of quartz in the fluidized bed.

It is advantageous that the majority of coke particles are predominantly discharged with the majority of quartz particles in the overflow fraction of the cyclone and are not returned to the reactor. However, it has also been surprisingly discovered that finely divided coke in the titanium dioxide-rich fraction, under the flow conditions used in fluidized bed generally employed by the titanium dioxide manufacturing industry, is not in fact kept in the fluidized bed and burned, but like the silica, is rapidly carried away unreacted and discharged with the gas stream out of the reactor to be reprocessed in the hydrocyclone.

In the low-titanium-dioxide fraction of the hydrocyclone overflow, in addition to quartz, the finely divided coke portion is predominantly recovered. Although this coke fraction, has a higher quartz content than present discharges, the heating value of this co-product is still better than that produced hitherto. Such prior waste products contained much higher amounts of filtered-off waste chloride solids (greater than the quantity of quartz in the present process), and were still useable as fuel. Note that as an important aspect of the invention, even if the hydrocyclone overflow cannot be further used and has to be disposed of by land-filling, the process according to the invention decreases the amount of product to be land-filled.

Since the process can be used with a single separation apparatus, normally a hydrocyclone, and with little monitoring of the operating parameters necessary, the process proves to be very reliable and inexpensive.

According to the invention a hydrocyclone apparatus is operated under process parameters producing a relatively low radial velocity. Depending on the throughput, a plurality of hydrocyclones can be connected in parallel. As an advantage, diminished monitoring or control is necessary if operations are carried out under the inventive process conditions.

Using the process of the invention, a titanium dioxide-rich composition fraction and a low titanium dioxide composition fraction are produced. It is to be understood that it is also possible to have additional fractions if so desired. The titanium dioxide-rich composition can surprisingly comprise as much as 20–40% silica and still be reuseable as an input into the chlorination reactor.

A hydrocyclone is preferred as the separation apparatus. For our invention, the ratio of diameter to inlet pressure of the hydrocyclone apparatus is preferably in the range from 40 to 180 mm/$bar_{abs}$ with the ratio of volume of overflow fraction to volume of underflow fraction in the range of from 6 to 12. It is also preferred to maintain the inlet pressure to the separation apparatus at about 1.3 to 1.5 $bar_{abs}$. It is usually preferred that the input suspension have a temperature around 60° C. and the content of the dissolved metal chloride be not more than about 40% by weight. Since these preferred parameters essentially influence the viscosity and the density, and are mutually dependent, a wide variety of other ranges can be utilized as can a wide variety of other ratios.

The suspensions exiting from the hydrocyclone overflow and underflow can be filtered into a filter cake (filter press, belt filter); and the resultant filter cake washed. The filtrate from both fractions can be used, for example, as a chemical reagent in water treatment.

For recycling to the chlorinator it is preferred to dry the fraction involved. The dried filter cake from the titanium-dioxide-rich fraction is also preferably ground. For grinding a ball or similar type mill is preferred. A degree of milling until a particle size d<0.1 mm of 50–99% is normally utilized with a range of 90–99% preferred.

Using the inventive process, up to 75% of the titanium dioxide discharged from the reactor unreacted can now be successfully recycled and utilized by further conversion into titanium tetrachloride and eventually pure titanium dioxide.

BRIEF DESCRIPTION OF THE DRAWING

The invention is illustrated in the drawing and further described in an exemplary fashion below.

Figure 1:
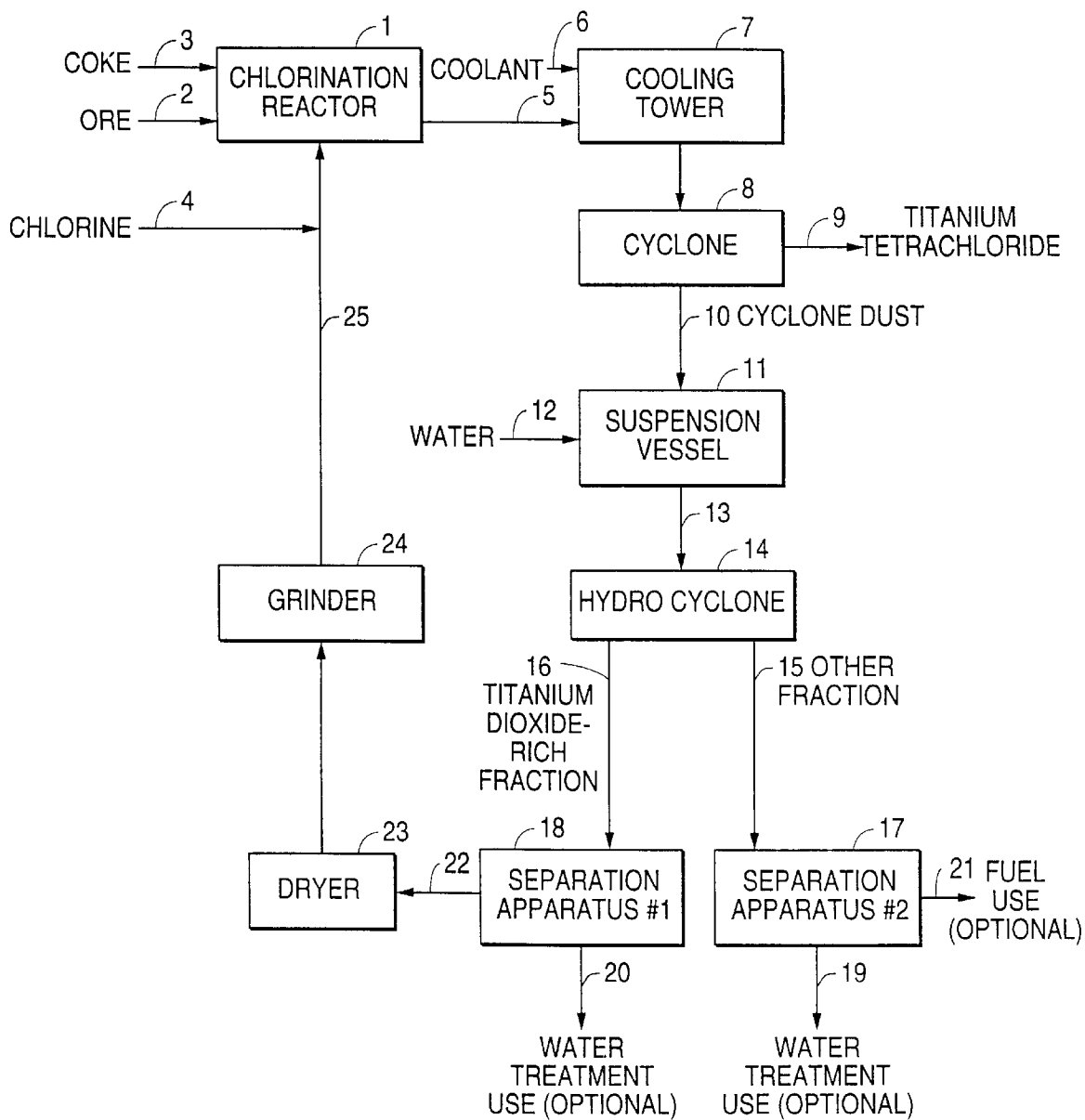
FIG. 1 shows in block diagram form, a representative process of chlorination with dust separation and recycling of unreacted titanium dioxide utilizing the inventive process.

In a chlorination reactor 1 constructed as a fluidized-bed reactor, the metal oxides in the ore largely are converted into gaseous metal chlorides from the ore 2. This ore is preferably titanium-dioxide-enriched slag. Coke 3, preferably petroleum coke, and chlorine gas 4 are introduced and are involved in a heterogeneous solid reaction with considerable amounts of carbon dioxide and carbon monoxide being formed. The chlorine source (and fluidizing medium) is circulated gas (in this case, recycled chlorine) returned from the oxidation of titanium tetrachloride. The circulated gas contains approximately 75 to 80% by volume of chlorine and, in addition nitrogen and carbon dioxide and, about 3–8% by volume of oxygen. The reaction gas mixture 5 exiting from the reactor 1 is composed of constituents such as CO, $CO_2$, COS, HCl, $N_2$, low-boiling and high-boiling chlorides such as $Ti_4Cl$, $Fe_3Cl$, $Fe_2Cl$, $SnCl_4$, $SiCl_4$, $VOCl_3$, $NaAlCl_4$, and unreacted solids such as $TiO_2$, $SiO_2$ as well as unburned coke. By cooling the gas/solid mixture (by quenching), a high-boiling fraction is condensed in the cooling tower 7 and separated off in a cyclone 8. Further treatment of the vaporous titanium tetrachloride exiting at 9 to make titanium dioxide is well known and is of no significance for the present invention.

The solids separated off by the cyclone 8 are termed cyclone dust 10 or—because these solids are frequently disposed of by land-filling after further treatment—waste chlorides. They are in this example made into a liquid paste or concentrate in the suspension vessel 11 by the addition of water 12. A suspension 13 forms in this process; metal chlorides in the suspension, in particular $FeCl_2$, pass into solution. The solids include the solids discharged from the fluidized bed: such solids are mostly unreacted $TiO_2$ and $SiO_2$, from the ore, as well as coke.

Classification or fractionalization is then performed in a hydrocyclone 14. The target products are a low titanium-dioxide fraction and a titanium dioxide-rich fraction. Silica in large measure accumulates in the low titanium dioxide fraction.

The hydrocyclones used (in this example, connected in parallel) had a diameter of 70–100 mm, the inlet pressure was 1.3–1.5 $bar_{abs}$, the volume of the overflow was around 8 times that of the underflow, the silica "enrichment" took place in the overflow 15 and the titanium dioxide enrichment took place in the underflow 16.

The viscosity and density of the suspension can influence the separation ratios and largely depends on the concentration of the metal chlorides in the suspension. The temperature of the suspension preferably should not be below around 50° C. to 60° C. and/or an iron(II) content of around 5 to 25% by weight preferably should be maintained. Around 50% or more by weight of the quartz contained in the cyclone dust was discharged into the overflow fraction of the cyclone. The underflow of the cyclone contained up to 30% by weight of the coke discharged from the reactor 1.

The two fractions, the suspensions from the overflow 15 and underflow 16 of the hydrocyclone 14, were, in this example, further treated separately in the same manner; the boxes 17 and 18 in the drawing represent separation apparatuses (a belt filter or filter press); filter cake washing is not shown individually. The filtrates 19, 20 can be further used, for example, as chemical reagents for water treatment. The solids 21 formed in the separation apparatus 17 can be used as fuel; as a result of separating off the $TiO_2$, the heating value of the fuel is higher and its ash content lower than that of "total" cyclone dust (21 and 22). The titanium-dioxide-rich solids 22 separated off from the separation apparatus 18 are dried 23 and ground 24 and returned to the reactor 1 mixing in with chorine 4.

The material to be returned to the reactor 1 is fed in where the chlorine concentration is highest, that is in the lower region of the fluid bed of the reactor 1. By this measure the returned titanium dioxide particles are virtually completely converted into titanium tetrachloride, even if, because of their small size and the speeds involved, they do not remain long in the fluidized bed. The silica particles and coke particles are rapidly discharged from the fluid bed without problem, so that owing to their return no meaningful "enrichment" of the quartz in the fluidized bed occurs.

EXAMPLE 1

Prior Art

A fluidized-bed reactor was charged at 950° C. with 7790 parts of slag (85% $TiO_2$, 11% FeO, 1.6% $SiO_2$), 2560 parts of coke and 12050 parts of chlorine gas, from which 14730 parts of titanium tetrachloride and 3755 parts of a solid mixture were formed. The solids mixture contained 2455 parts metal chlorides, in particular 1520 parts of iron(II) chloride, 415 parts of titanium dioxide, 765 parts of coke and 120 parts of quartz. The solids mixture was made into an aqueous paste suspension with 5300 parts of water, the suspension was filtered in a filter press and the filter cake washed. 1860 parts of cake were made having a water content of 30% by weight; after drying the cake had the following composition: coke 58.7% by weight, titanium dioxide 32% by weight, silica 9.3% by weight. The heating value of the material, because of the high ash content of 41.3%, was about 21300 kJ/kg.

EXAMPLE 2

Under the same starting conditions as in Example 1, a 6,740 liter suspension which contained 9050 parts of solids (having an iron content of 8.5% by weight) were applied to a battery of hydrocyclones (connected in parallel). The hydrocyclones 14 were characterized by the following parameters: diameter 75 mm, diameter of the overflow nozzle 18 mm, diameter of the underflow nozzle 6 mm. The feed pressure was 1.5 $bar_{abs}$. The suspension had a temperature of 60° C.

In the overflow of the hydrocyclone, a 6,020 liter suspension with 104 parts of $TiO_2$, 490 parts of coke and 59 parts of $SiO_2$ were discharged. In the underflow of the hydrocyclone a 720 liter suspension with 311 parts of $TiO_2$, 275 parts of coke and 61 parts of $SiO_2$ was discharged. The second suspension was filtered on a membrane filter press and washed. The washed cake was ground and dried at 90° C. in a ball mill directly heated by combustion gases (D=1.2 m, l=4 m). The ground product had the following particle size distribution:

| | |
|---|---|
| d > 0.2 mm | 0% |
| 0.2 to 0.09 mm | 1% |
| 0.09 to 0.063 mm | 19% |
| 0.063 to 0.04 mm | 32% |
| below 0.04 mm | 48%. |

The ground titanium-dioxide-rich fraction was reapplied to the chlorination reactor via a pressure lock system. 700 kg/h in a nitrogen stream of 90 $m^3$(S.T.P.)/h were introduced into the chlorination reactor via a star valve feeder. 97.5% by weight of the returned titanium dioxide dust was converted into titanium tetrachloride. The silica content in the fluid bed, even after 22 hours, remained unchanged at 14% by weight.

From the overflow of the hydrocyclone, after filtration, 946 parts of moist cake arose (31% by weight water content). The solids portion was composed of 75.0% by weight of coke, 15.9% by weight of titanium dioxide, 9.0% by weight of silica. The ash content of this product was lower by approximately 56.5% than that described in Example 1, i.e. the heating value was 27200 kJ/kg.

The invention being this described, it will be obvious that the same may be varied in many ways and in a variety of modifications. Such changes are not to be regarded as a departure from the spirit and scope of the invention and are intended to be covered by the claims below.

What we claim:

1. In process for the production of titanium dioxide by chlorination of titanium-containing ore in a fluidized bed chlorination reactor which includes discharging from the reactor a mixture comprising metal chlorides and other material including unreacted titanium dioxide ($TiO_2$) and silica ($SiO_2$) from the ore, and coke, the improvement comprising;
    (a) cooling the mixture to form a solid mixture containing solid particles of condensed metal chlorides and titanium dioxide, coke and silica,
    (b) suspending the solid mixture in an aqueous suspension,
    (c) classifying the solids particles of the aqueous suspension in a hydrocyclone or hydrocyclones connected in parallel to create two recovered fractions one of which is titanium dioxide-rich but which still contains some quantity of silica and coke;
    (d) returning the recovered titanium dioxide-rich fraction to the chlorination reactor in a stream with chlorine-containing gas.

2. The process of claim 1 including the additional process step of grinding the recovered titanium dioxide-rich fraction so that at least about 50% of the particles of the fraction are smaller than 0.1 mm.

3. The process of claim 2 including the additional process step of drying the recovered titanium dioxide-rich fraction.

4. The process of claim 1 wherein the recovered titanium dioxide-rich fraction is introduced in the lower region of the chlorination reactor.

5. The process of claim 1 wherein the temperature of the aqueous suspension is at least about 50° C.

6. The process of claim 1 wherein about 5 to 25% by weight of iron(II) chloride is dissolved in the suspension.

7. The process of claim 1 in which the volume ratio of overflow to underflow from the hydrocylone is between 6 and 12 to 1.

8. The process of claim 1 wherein the inlet pressure to the hydrocyclone is between about 1.3 to 1.5 $bar_{abs}$.

9. In a process for the production of titanium dioxide by chlorination of titanium-containing ore in a fluidized bed chlorination reactor which includes discharging from the reactor a mixture comprising metal chlorides and other material including unreacted titanium dioxide ($TiO_2$) and silica ($SiO_2$) from the ore, and coke, the improvement comprising;
    (a) cooling the mixture to form a solid mixture containing solid particles of condensed metal chlorides and titanium dioxide, coke and silica,
    (b) suspending the solid mixture in an aqueous suspension,
    (c) classifying the solids particles of the aqueous suspension in a hydrocyclone or hydrocyclones connected in parallel to create two recovered fractions one of which is titanium dioxide-rich but which still contains some quantity of silica and coke;
    (d) grinding the recovered titanium dioxide-rich fraction so that at least about 50% of the particles of the fraction are smaller than 0.1 mm, and
    (e) returning the ground recovered titanium dioxide-rich fraction to the chlorination reactor.

10. The process of claim 9 including the additional process step of drying the recovered titanium dioxide-rich fraction.

11. The process of claim 9 wherein the recovered titanium dioxide-rich fraction is introduced in the lower region of the chlorination reactor.

12. The process of claim 9 wherein the temperature of the aqueous suspension is at least about 50° C.

13. The process of claim 9 wherein about 5 to 25% by weight of iron(II) chloride is dissolved in the aqueous suspension.

14. The process of claim 9 in which the volume ratio of overflow to underflow from the hydrocylone is between 6 and 12 to 1.

15. The process of claim 9 wherein the inlet pressure to the hydrocyclone is between about 1.3 to 1.5 $bar_{abs}$.

16. The process of claim 9 wherein the returning of the recovered titanium dioxide-rich fraction is in a stream with the chlorine-containing gas.

* * * * *